US011825158B2

(12) United States Patent
Lesser et al.

(10) Patent No.: US 11,825,158 B2
(45) Date of Patent: Nov. 21, 2023

(54) AUTOMATION OF SPONSOR INITIATED CONTENT DELIVERY

(71) Applicant: Disney Enterprises, Inc., Burbank, CA (US)

(72) Inventors: Max Ades Lesser, San Francisco, CA (US); Bryant Pinto, Haywood, CA (US); Anmeen Leong, San Mateo, CA (US); Ty Coghlan, Portland, OR (US); Kevin Mack Leetham, Camas, WA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 17/692,032

(22) Filed: Mar. 10, 2022

(65) Prior Publication Data

US 2023/0291964 A1 Sep. 14, 2023

(51) Int. Cl.
*H04N 21/442* (2011.01)
*H04N 21/61* (2011.01)
*H04N 21/258* (2011.01)

(52) U.S. Cl.
CPC . *H04N 21/44204* (2013.01); *H04N 21/25875* (2013.01); *H04N 21/6125* (2013.01); *H04L 2463/101* (2013.01)

(58) Field of Classification Search
CPC ....... H04N 21/44204; H04N 21/25875; H04N 21/6125; H04L 2463/101
See application file for complete search history.

(56) References Cited

U.S. PATENT DOCUMENTS

2019/0141398 A1\* 5/2019 Auxer ................. H04N 21/472
2021/0397308 A1\* 12/2021 Rahman ........... H04N 21/47211

OTHER PUBLICATIONS

"Get two free months of Microsoft 365 Family or Personal." Office Watch, Jun. 15, 2021, https://office-watch.com/2021/get-two-free-months-of-microsoft-365-family-or-personal/ (Year: 2021).\*

\* cited by examiner

*Primary Examiner* — Kunal Langhnoja
(74) *Attorney, Agent, or Firm* — Farjami & Farjami LLP

(57) ABSTRACT

A content delivery system includes a computing platform having processing hardware and a system memory storing software code, a user account database, and a content database. The processing hardware executes the software code to receive, from a user device utilized by a user, a request for access to a first content of a plurality of contents, the request including an identifier of a sponsor of the request, to verify, using the identifier, an authorization status of the sponsor, and transmit to the user device, based on verification of the authorization status of the sponsor, content access data enabling access to the first content by the user. The processing further executes the software code to detect that the user is accessing the first content, and to offer, in response to detecting that access, an opportunity to the user to obtain access to the plurality of contents.

20 Claims, 4 Drawing Sheets

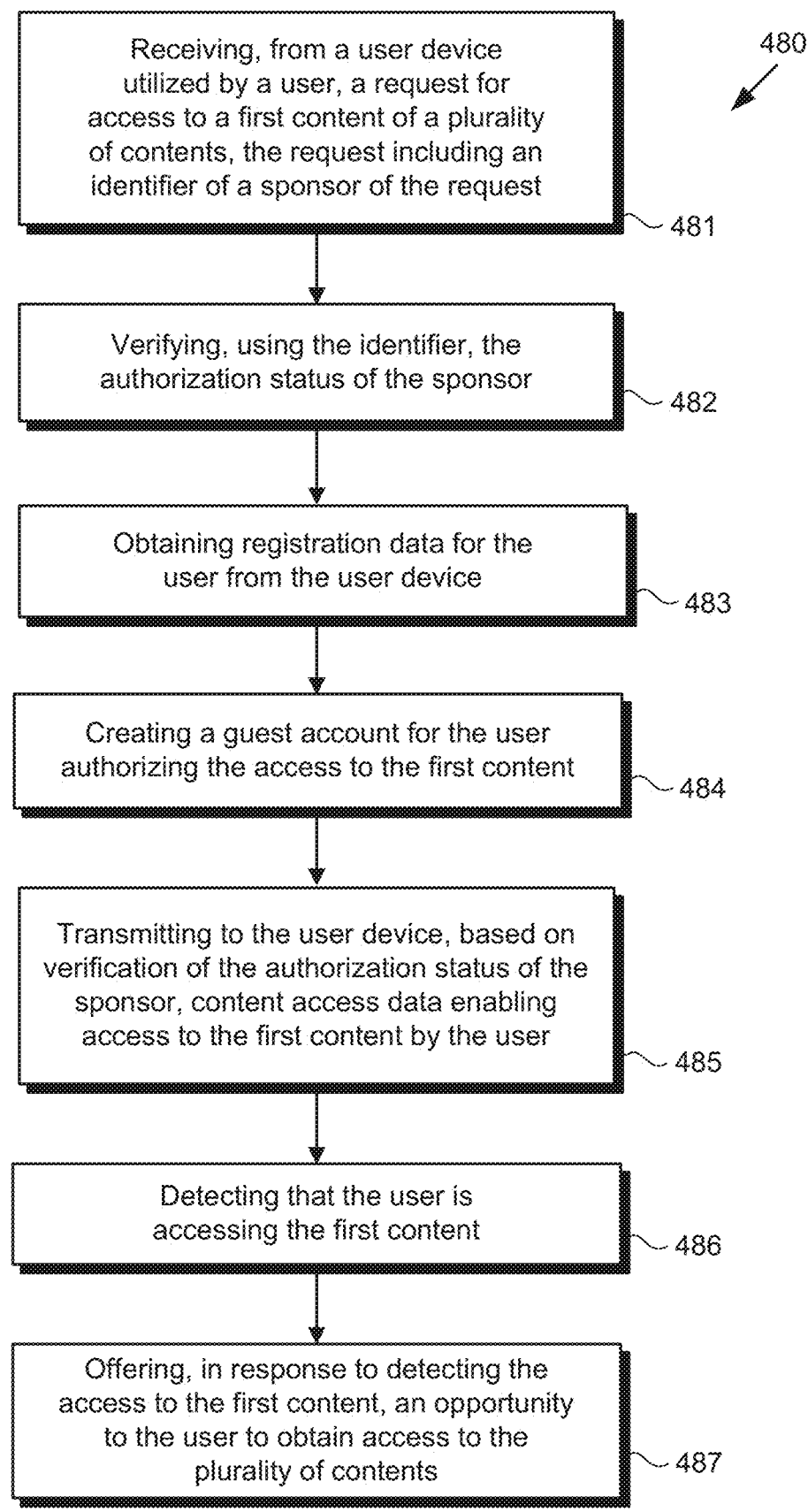

AUTOMATION OF SPONSOR INITIATED CONTENT DELIVERY

BACKGROUND

There are many situations in which a user who has access to content they enjoy may want their friends to be able to enjoy that content as well. For example, a user having a subscription to a content delivery service hosting a proprietary television (TV) series enjoyed by the subscribing user may want to introduce a non-subscribing friend to that TV series by providing access to a particular episode or other limited sample of the series content. In instances in which the content delivery service to which the user subscribes offers a free trial subscription, the subscribing user may encourage their non-subscribing friend to sign up for the free trial period. However, for a variety of business reasons, some content delivery services may decline to offer free trials. In those situations, the subscribing user may be inclined to share their own subscriber credentials with their friend. However, sharing such credentials typically grants full access to the account held by the subscribing user. Moreover, in instances where third-party Identity Providers (IDPs) such as Facebook® or Google® are used to authenticate the subscribing user, enabling access to the subscriber account may undesirably include providing full access to those third-party accounts as well. Nevertheless, the interests of the subscribing user in sharing their content consumption experience with friends, as well as the interests of the content delivery service in promoting its proprietary content would be served by a solution enabling the subscribing user to sponsor their non-subscribing friends to obtain limited access to content endorsed by the subscribing user.

BRIEF DESCRIPTION OF THE DRAWINGS

FIG. 4 shows a flowchart outlining an exemplary method for automating sponsor initiated content delivery, according to one implementation.

DETAILED DESCRIPTION

Figure 1:
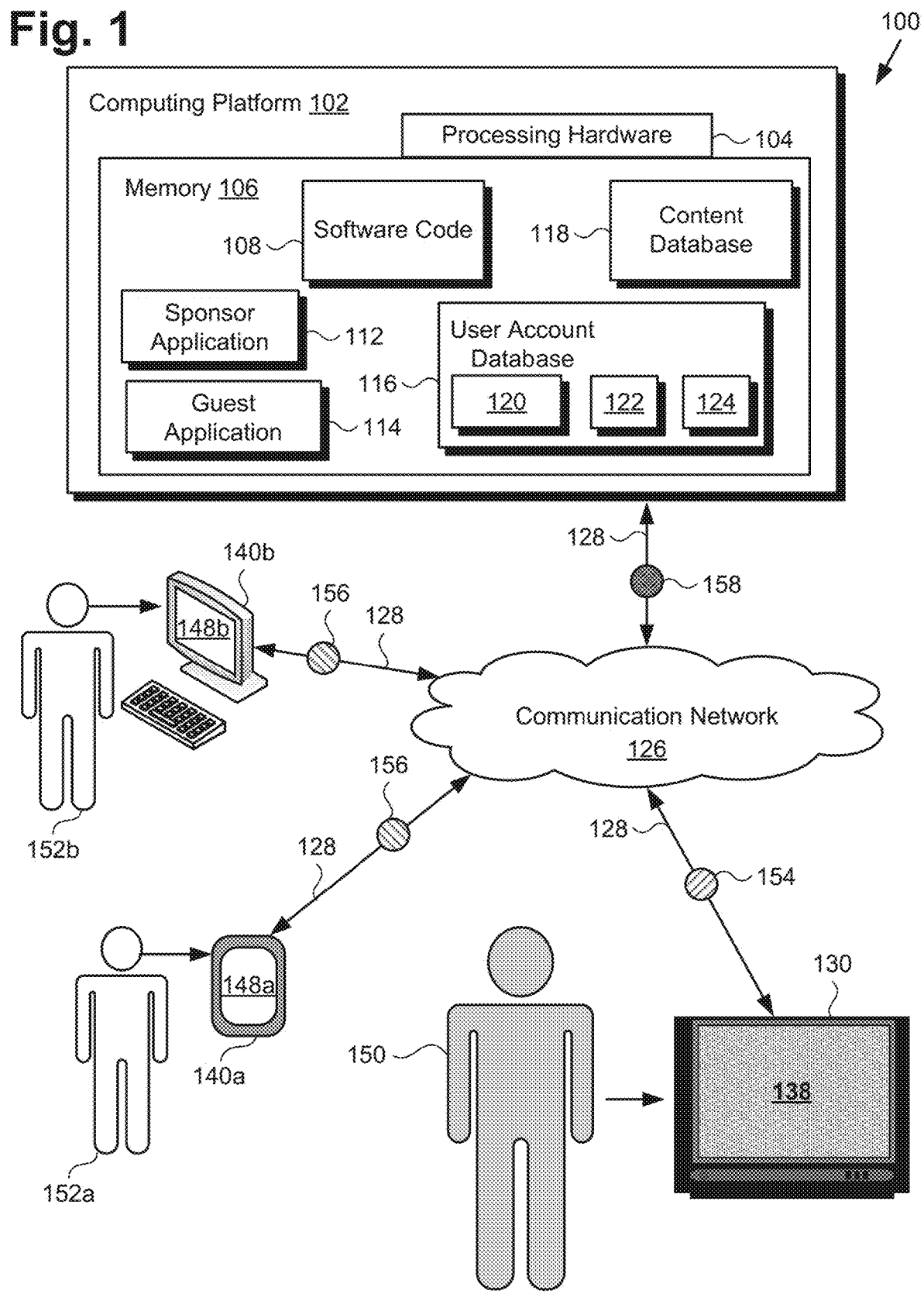
FIG. 1 shows a diagram of an exemplary content delivery system for automating sponsor initiated content delivery, according to one implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

As stated above, there are many situations in which a user who has access to content they enjoy may want their friends to be able to enjoy that content as well. For example, a user having a subscription to a content delivery service hosting a proprietary television (TV) series enjoyed by the subscribing user, may want to introduce a non-subscribing friend to that TV series by providing access to a particular episode or other limited sample of the series content.

As further stated above, in instances in which the content delivery service to which the user subscribes offers a free trial subscription, the subscribing user may encourage their non-subscribing friend to sign up for the free trial period. However, for a variety of business reasons, some content delivery services may decline to offer free trials. In those situations, the subscribing user may be inclined to share their own subscriber credentials with their friend. However, sharing such credentials typically grants full access to the account held by the subscribing user. Moreover, in instances where third-party Identity Providers (IDPs) such as Facebook® or Google® are used to authenticate the subscribing user, enabling access to the subscriber account may undesirably include providing full access to those third-party accounts as well.

The present application discloses systems and methods for automating sponsor initiated content delivery that address and overcome the obstacles to content sharing described above. For example, when applied to the exemplary use case described above, the novel and inventive solution disclosed in the present application advantageously serves the interests of the subscribing user in sharing their content consumption experience with friends, while also serving the interests of the content delivery service in promoting its proprietary content.

It is noted that, as defined in the present application, the term "sponsor" refers to an authorized user of a service, or to a business affiliate of the provider of that service, but does not refer to the service provider itself. Thus, in the exemplary use case of a subscription-based content delivery service, a sponsor may be a subscriber to the content delivery service. Alternatively, or in addition, in the exemplary use case of a subscription-based content delivery service a sponsor may refer to a business, such as an entertainment venue, travel service provider, or product retailer other than the content delivery service, for example, that is a subsidiary of a parent business entity of which the content delivery service is also a subsidiary. As yet another example, a business affiliate may be a third-party business entity having a contractual or cross promotional relationship with the content delivery service.

It is further noted that, as defined in the present application, the terms "automation," "automated." and "automating" refer to systems and processes that do not require the participation of a human user, such as a human system administrator. For example, although in some implementations a human system administrator may review the performance of the systems and methods disclosed herein, and, in some cases may adjust their performance over time, that human involvement is optional. Thus, in some implementations, the processes described in the present application may be performed under the control of hardware processing components of the disclosed systems.

FIG. 1 shows a diagram of exemplary content delivery system 100, according to one implementation. Content delivery system 100 includes computing platform 102 having processing hardware 104 and system memory 106 implemented as a computer-readable non-transitory storage medium. As shown in FIG. 1, system memory 106 stores software code 108, sponsor application 112, guest application 114, user account database 116, and in some implementations may optionally store content database 118.

As further shown in FIG. 1, user account database 116 includes sponsor account 120, and one or more guest accounts 122 and 124 sponsored by sponsor account 120. In addition, FIG. 1 shows user device 130 utilized by account holder 150 of sponsor account 120 (hereinafter "sponsor 150"), and one or more other user device(s) 140a and 140b (hereinafter "user device(s) 140a/140b") utilized by respective one or more guest users 152a and 152b (hereinafter "guest user(s) 152a/152b") associated with respective guest accounts 122 and 124. As shown in FIG. 1, user device 130 and user device(s) 140a/140b are in communication with computing platform 102 via communication network 126 and network communication links 128. Also shown in FIG. 1 are guest invitation 154, request 156, content access data 158, and displays 138, 148a, and 148b of respective user devices 130, 140a, and 140b.

According to the implementation shown in FIG. 1, sponsor 150 holding sponsor account 120 may utilize user device 130 and communication network 126 to interact with guest user(s) 152a/152b. Such an interaction may include providing, using user device 130, guest invitation 154 inviting guest users) 152a/152b to access at least some content stored in content database 118. Guest user(s) 152a/152b may then utilize respective user device(s) 140a/140b and communication network 126 to submit request 156 for access to the content identified in guest invitation 154, to content delivery system 100, where request 156 also identifies sponsor 150. Content delivery system 100, upon verifying the authorization status of sponsor 150, may transmit content access data 158, in the form of an authentication token or link for example, enabling guest user(s) 152a/152b to access the content identified in request 156. The content access provided to guest user(s) 152a/152b based on guest invitation 154 may be usage-limited, time-limited, or any combination thereof. In response to detecting access to the content identified in request 156, by guest user(s) 152a/152b, content delivery system 100 may offer to guest user(s) 152a/152b an opportunity to obtain access to some or all other content stored in content database 118.

With respect to the representation of system 100 shown in FIG. 1, it is noted that although software code 108, sponsor application 112, guest application 114, user account database 116, and content database 118 are depicted as being stored in system memory 106 for conceptual clarity, more generally, system memory 106 may take the form of any computer-readable non-transitory storage medium. The expression "computer-readable non-transitory storage medium." as used in the present application, refers to any medium, excluding a carrier wave or other transitory signal that provides instructions to processing hardware of a computing platform, such as processing hardware 104 of computing platform 102. Thus, a computer-readable non-transitory storage medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory storage media include, for example, optical discs, RAM, programmable read-only memory (PROM), erasable PROM (EPROM), and FLASH memory.

It is further noted that although FIG. 1 depicts software code 108, sponsor application 112, guest application 114, user account database 116, and content database 118 as being mutually co-located in system memory 106, that representation is also merely provided as an aid to conceptual clarity. More generally, content delivery system 100 may include one or more computing platforms, such as computer servers for example, which may be co-located, or may form an interactively linked but distributed system, such as a cloud-based system, for instance. As a result, processing hardware 104 and system memory 106 may correspond to distributed processor and memory resources within content delivery system 100. Thus, it is to be understood that software code 108, sponsor application 112, guest application 114, user account database 116, and content database 118 may be stored remotely from one another within the distributed memory resources of content delivery system 100. Furthermore, in some implementations, content database 118 may not be an element of content delivery system 100, but may rather be a remote resource communicatively coupled to content delivery system 100 by communication network 126 and network communication links 128.

Processing hardware 104 may include a plurality of hardware processing units, such as one or more central processing units, one or more graphics processing units, one or more tensor processing units, one or more field-programmable gate arrays (FPGAs), and an application programming interface (API) server, for example. By way of definition, as used in the present application, the terms "central processing unit" (CPU). "graphics processing unit" (GPU), and "tensor processing unit" (TPU) have their customary meaning in the art. That is to say, a CPU includes an Arithmetic Logic Unit (ALU) for carrying out the arithmetic and logical operations of computing platform 102, as well as a Control Unit (CU) for retrieving programs, such as image analysis and indexing software code 110, from system memory 106, while a GPU may be implemented to reduce the processing overhead of the CPU by performing computationally intensive graphics or other processing tasks. A TPU is an application-specific integrated circuit (ASIC) configured specifically for artificial intelligence (AI) applications such as machine learning modeling.

In some implementations, computing platform 102 may correspond to one or more web servers, accessible over a packet-switched network such as the Internet, for example. Alternatively, computing platform 102 may correspond to one or more computer servers supporting a private wide area network (WAN), local area network (LAN), or included in another type of limited distribution or private network. As yet another alternative, in some implementations, content delivery system 100 may be implemented virtually, such as in a data center. For example, in some implementations, content delivery system 100 may be implemented in software, or as virtual machines.

Although user devices 130, 140a, and 140b are shown respectively as a smart TV, a smartphone or tablet computer, and a desktop computer in FIG. 1, those representations are provided merely as examples as well. More generally, user devices 130, 140a, and 140b may be any suitable mobile or stationary computing devices or systems that implement data processing capabilities sufficient to provide a user interface, support connections to communication network 126, and implement the functionality ascribed to user devices 130, 140a, and 140b herein.

With respect to displays 138, 148a, and 148b of respective user devices 130, 140a, and 140b, displays 138, 148a, and 148b may be physically integrated with respective user devices 130, 140a, and 140b, or may be communicatively coupled to but physically separate from respective user devices 130, 140a, and 140b. For example, where user devices 130, 140a, and 140b are implemented as smartphones, laptop computers, or tablet computers, displays 138, 148*a*, and 148*b* will typically be integrated with respective user devices 130, 140*a*, and 140*b*. By contrast, where user devices 130, 140*a*, and 140*b* are implemented as desktop computers, respective displays 138, 148*a*, and 148*b* may take the form of monitors separate from user devices 130, 140*a*, and 140*b* in the form of computer towers. Furthermore, displays 138, 148*a*, and 148*b* may be implemented as liquid crystal displays (LCDs), light-emitting diode (LED) displays, organic light-emitting diode (OLED) displays, quantum dot (QD) displays, or any other suitable display screens that perform a physical transformation of signals to light.

Figure 2:
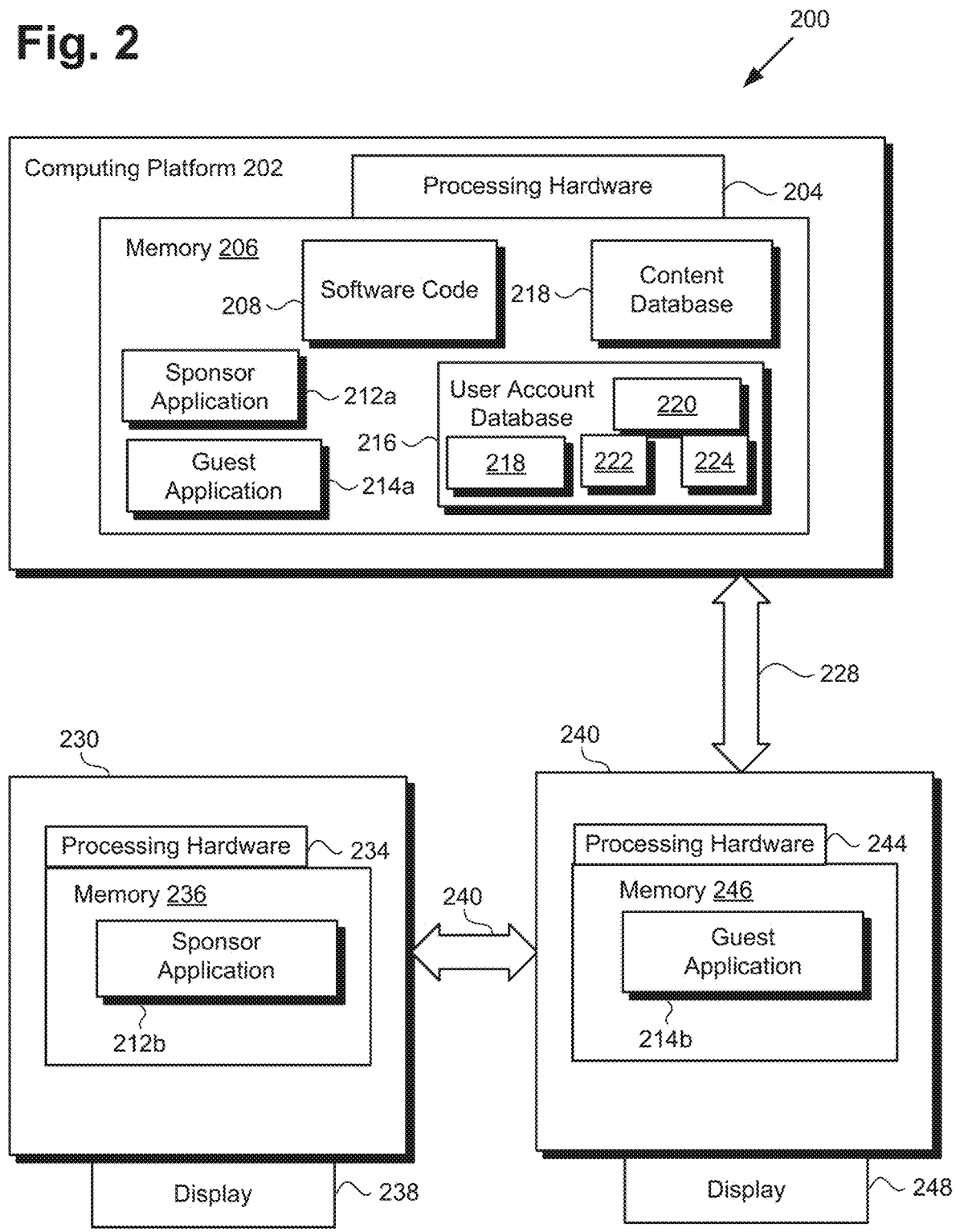
FIG. 2 shows another exemplary implementation of a content delivery system for automating sponsor initiated content delivery.

FIG. 2 shows another exemplary implementation of content delivery system 200, in combination with more detailed exemplary representations of user devices 230 and 240 shown to be interactively coupled to one another by communication link 228. Content delivery system 200 includes computing platform 202, which is shown to be interactively coupled to user device 240 by network communication link 228.

Computing platform 202 includes processing hardware 204, and system memory 206 implemented as a computer-readable non-transitory storage medium storing software code 208, sponsor application 212*a*, guest application 214*a*, user account database 216, and, optionally, content database 218. As shown in FIG. 2, user account database 216 includes sponsor account 220, and one or more guest accounts 222 and 224 sponsored by sponsor account 220. As further shown in FIG. 2, user device 230 includes processing hardware 234, memory 236 storing sponsor application 212*b*, and display 238, while user device 240 is shown to include processing hardware 244, memory 246 storing guest application 214*b*, and display 248.

Network communication links 228, and content delivery system 200 including computing platform 202 having processing hardware 204 and system memory 206, correspond respectively in general to network communication links 128, and content delivery system 100 including computing platform 102 having processing hardware 104 and system memory 106, in FIG. 1. Thus, network communication links 228 and content delivery system 200 including computing platform 202 having processing hardware 204 and system memory 206 may share any of the characteristics attributed to respective communication links 128 and content delivery system 100 including computing platform 102 having processing hardware 104 and system memory 106 by the present disclosure, and vice versa.

In addition, software code 208, sponsor application 212*a*, guest application 214*a*, user account database 216, content database 218, sponsor account 220, and guest accounts 222 and 224, in FIG. 2, correspond in general to software code 108, sponsor application 112, guest application 114, user account database 116, content database 118, sponsor account 120, and guest accounts 122 and 124, in FIG. 1. In other words, software code 208, sponsor application 212*a*, guest application 214*a*, user account database 216, content database 218, sponsor account 220, and guest accounts 222 and 224 may share any of the characteristics attributed to respective software code 108, sponsor application 112, guest application 114, user account database 116, content database 118, sponsor account 120, and guest accounts 122 and 124 by the present disclosure, and vice versa.

User device 230 having display 238 corresponds in general to user device 130 having display 138, in FIG. 1, and those corresponding features may share any of the characteristics attributed to either corresponding feature by the present disclosure. That is to say, although not shown in FIG. 1, user device 130 may include features corresponding respectively to processing hardware 234 and memory 236 storing sponsor application 212*b*, while display 238 may take the form of an LCD, an LED display, an OLED display, a QD display, or another suitable display screen that performs a physical transformation of signals to light. Moreover, sponsor application 212*b* corresponds in general to sponsor application 112/212*a* and may share any of the characteristics attributed to sponsor application 112/212*a* by the present disclosure.

User device 240 having display 248 corresponds in general to either or both of user device(s) 140*a*/140*b* having respective displays 148*a* and 148*b*, in FIG. 1, and those corresponding features may share any of the characteristics attributed to either corresponding feature by the present disclosure. Thus, although not shown in FIG. 1, user devices 140*a*/140*b* may include features corresponding respectively to processing hardware 244 and memory 246 storing guest application 214*b*, while display 248 may take the form of an LCD, an LED display, an OLED display, a QD display, or another suitable display screen that performs a physical transformation of signals to light. Furthermore, guest application 214*b* corresponds in general to guest application 114/214*a* and may share any of the characteristics attributed to guest application 114/214*a* by the present disclosure.

According to the exemplary implementation shown in FIG. 2, sponsor application 212*b* is located in memory 236 of user device 130/230, having been received from content delivery system 100/200 via network communication link 128/228. In one implementation, network communication link 128/228 corresponds to transfer of sponsor application 212*b* over a packet-switched network, for example, such as the Internet. Once transferred, for instance by being downloaded over network communication link 128/228, sponsor application 212*b* may be persistently stored in memory 236 and may be executed locally on user device 130/230 by processing hardware 234, to facilitate interaction with one or more of software code 108/208 or user device(s) 140*a*/140*b*/240. For example, user device 130/230 can utilize sponsor application 212*b* to send guest invitation 154 to user device(s) 140*a*/140*b*/240 via communication network 126 and network communication link 128/228.

Also, according to the exemplary implementation shown in FIG. 2, guest application 214*b* is located in memory 246 of user device(s) 140*a*/140*b*/240, having been received from content delivery system 100/200 via communication network 126 and network communication link 128/228. As noted above by reference to sponsor application 212*b*, in one implementation, network communication link 128/228 corresponds to transfer of guest application 214*b* over a packet-switched network such as the Internet. Once transferred, for instance by being downloaded over network communication link 128/228, guest application 214*b* may be persistently stored in memory 246 and may be executed locally on user device 140*a*/140*b*/240 by processing hardware 244, to facilitate interaction with software code 108/208 and user device(s) 130*a*/130*b*/230. That is to say, user device(s) 140*a*/140*b*/240 can utilize guest application 214*b* to receive guest invitation 154 from user device 130/230, to send request 156 to software code 108/208, and to receive content access data 158 from software code 108/208, via communication network 126 and network communication link 128/228.

Figure 3:
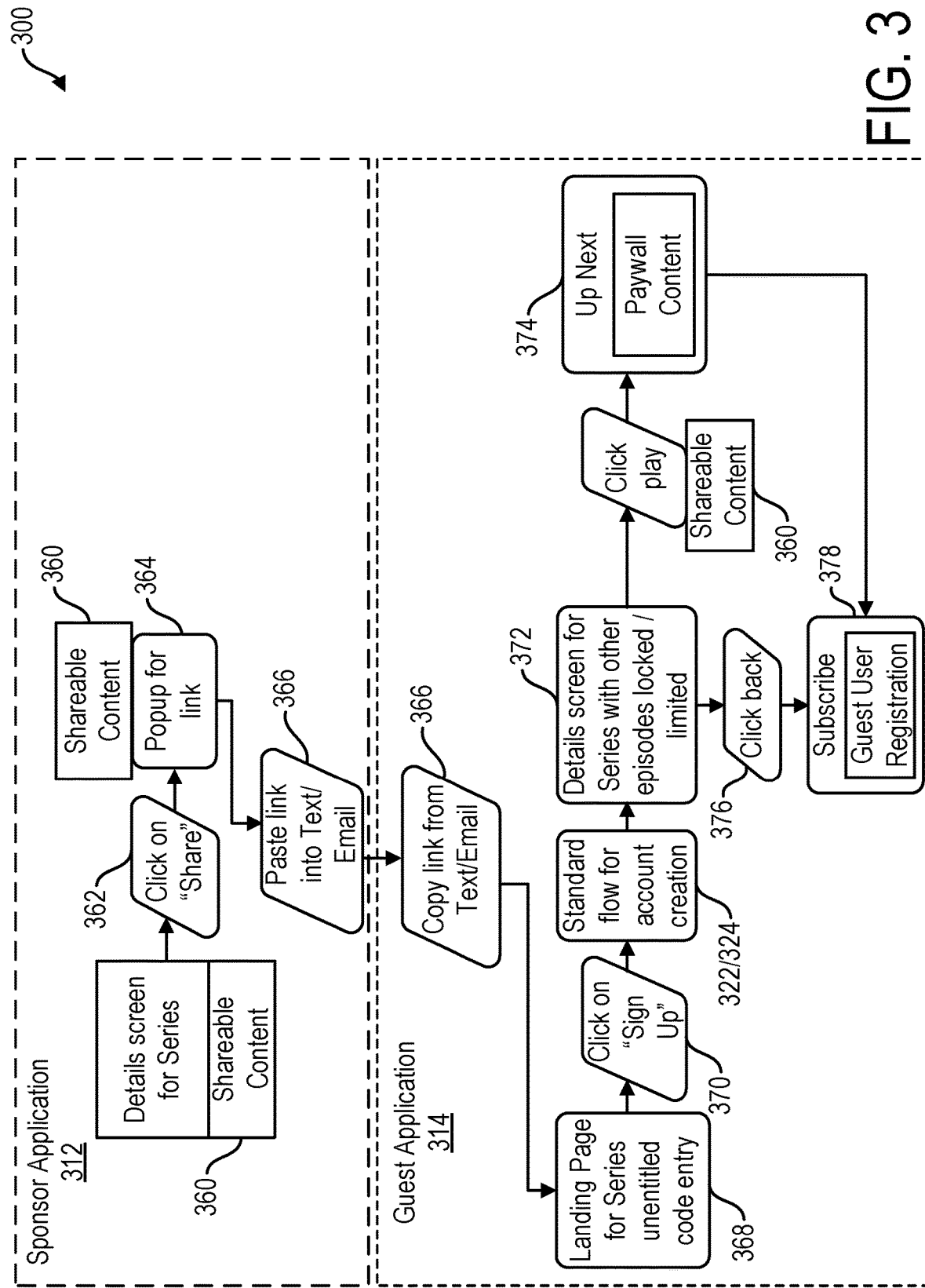
FIG. 3 shows a flow diagram depicting a process for performing sponsor initiated content delivery, according to one implementation.

FIG. 3 shows flow diagram 300 depicting a process for performing sponsor initiated content delivery, according to one implementation. Flow diagram 300 includes sponsor application block 312 and guest application block 314. It is noted that sponsor application block 312 includes actions that may be performed by sponsor 150 using sponsor application 212b executed by processing hardware 234 of user device 130/230, while guest application block 314 includes actions that may be performed by guest user(s) 152a/152b using guest application 214b executed by processing hardware 244 of user device(s) 140a/140b/240. It is noted that although the present novel and inventive principles may be applied to a variety of different use cases, in the interests of conceptual clarity flow diagram 300 will be described by reference to the exemplary use case in which content delivery system 100/200 provides a subscription-based content delivery service, sponsor 150 is a subscriber to content delivery system 100/200, and guest user(s) 152a/152b is/are non-subscribers to content delivery system 100/200.

As shown by sponsor application block 350, sponsor 150 may utilize a user interface provided by sponsor application 212b on user device 130/230 to discover shareable content 360. Shareable content 360 may include a single episode of TV content, a video clip, an audio clip, or a sample of a movie, digital book, or video game, for example, that sponsor 150 possesses an entitlement to, and that content delivery system has identified as being eligible for sharing with non-subscribers, such as guest user(s) 152a/152b. Once sponsor 150 identifies shareable content 360 that sponsor 150 wants user(s) 152a/152b to experience and enjoy, sponsor 150 can click or otherwise select share option 362 to trigger a popup 364 providing a link for use in accessing shareable content 360, and may paste that link into text or email 366 to be sent to user(s) 152a/152b.

As shown by guest application block 352, user(s) 152a/152b receive text or email 366 from sponsor 150 and may use the embedded link to navigate to landing page 368 for shareable content 360. In some implementations, landing page 368 for shareable content 360 may enable playout of shareable content 360 without requiring user(s) 152a/152b to register with content delivery system 100/200. However, in other implementations, as shown by flow diagram 300, user(s) 152a/152b may be prompted to provided registration data for creation of respective one or more guest accounts 322/324 corresponding respectively in general to guest accounts 122 and 124 in FIG. 1. According to the present exemplary implementations, user(s) 152a/152b are then shown details screen 372 identifying shareable content 360, and in some implementations, related content that is locked or otherwise paywall protected. User(s) 152a/152b can then access and play shareable content 360. When shareable content 360 is finished playing, guest application 214b may present user(s) 152a/152b with "Up Next" screen 374 identifying paywall protected subsequent content, such as the next episode of a TV series of which shareable content 360 is also an episode, or a subsequent sample of content including shareable content 360 as a segment. User(s) 152a/152b then have the option of selecting paywall protected content from Up Next screen 374 and being directed to subscription screen 378, or may navigate to subscription screen 378 using click back operation 376.

The functionality of content delivery system 100/200 for automating sponsor initiated content delivery, described above by reference to FIGS. 1, 2, and 3, will be further described below with reference to FIG. 4. FIG. 4 presents flowchart 480 outlining an exemplary method for automating sponsor initiated content delivery. With respect to the method outlined in FIG. 4, it is noted that certain details and features have been left out of flowchart 480 in order not to obscure the discussion of the inventive features in the present application. Moreover, although, as noted above by reference to FIG. 3, the present novel and inventive principles may be applied to a variety of different use cases, in the interests of conceptual clarity the method outlined by flowchart 480 will be described by reference to the exemplary use case in which content delivery system 100/200 provides a subscription-based content delivery service and guest user(s) 152a/152b is/are non-subscribers to content delivery system 100/200.

As shown in FIG. 4, flowchart 480 includes receiving, from one of user device(s) 140a/140b/240 utilized by respective user(s) 152a/152b, request 156 for access to a first content of a plurality of contents available from content delivery system 100/200, where request 156 includes an identifier of sponsor 150 of request 156 (action 481). The plurality of contents available from content delivery system 100/200 and including the first content requested in action 481 may include one or more of episodic TV content, video clips, and audio clips, as well as movies, digital books, and video games, to name a few examples. Thus, the first content requested in action 481 may be one of a single episode of TV content, a video clip, an audio clip, or a sample of a movie, digital book, or video game, for example.

As noted above, user(s) 152a/152b may be non-subscribers to content delivery system 100/200. In some use cases, as described above, sponsor 150 may be a subscriber to content delivery system 100/200 who wishes to share enjoyable content with friends in the form of user(s) 152a/152b.

However, in other use cases sponsor 150 may be a business affiliate of content delivery system 100/200, such as an entertainment venue, travel service provider, or product retailer for example, that is a subsidiary of a parent business entity of which the content delivery system 100/200 is also a subsidiary. Alternatively, sponsor 150 may be a business affiliate of content delivery system 100/200 in the form a third-party business entity having a contractual or cross promotional relationship with content delivery system 100/200. By way of example, where sponsor 150 is an entertainment venue, sponsor 150 may award user(s) 152a/152b with guest invitation 154 in response to user(s) 152a/152b having attended or participated in an event hosted by sponsor 150. As another example, where sponsor 150 is a business affiliate providing a retail product or offering a service, sponsor 150 may award user(s) 152a/152b with guest invitation 154 in response to user(s) 152a/152b having purchased the product or having purchased or subscribed to the service.

It is noted that the access to the first content sought by request 156 may be one or more of usage-limited access or time-limited access. Usage-limited access may limit the number of times user(s) 152a/152b can access the first content to which access is sought by request 156. Time-limited access may restrict access to a certain window of time, such as a predetermined time interval once access to the first content is made available, or to certain times during the day, or certain days of the week.

In some implementations, sponsor 150 may be limited in the number of guest invitations 154 that sponsor 150 may issue. For example, where sponsor 150 is an individual user who subscribes to content delivery system 100/200, sponsor 150 may be limited to issuing a predetermined number of guest invitations 154 per subscription cycle. e.g., per month. Moreover, such a predetermined number may vary depending on the subscription tier to which sponsor 150 subscribes.

In some implementations, guest invitation 154 may only be redeemed by user(s) 152a/152b to who sponsor 150 issues guest invitation 154. However, in other implementations, content delivery system 100/200 may enable user(s)

152a/152b receiving guest invitation 154 to forward guest invitation 154 to one or more other users in lieu of sending request 156 for access to the first content to content delivery system 100/200, or may enable user(s) 152a/152b to forward guest invitation 154 to one or more other users while also using request 156 to obtain access to the first content from content delivery system 100/200.

Request 156 may be received by software code 108/208 of content delivery system 100/200, executed by processing hardware 104/204. As shown in FIGS. 1 and 2, request 156 may be received by software code 108/208 from one of user device(s) 140a/140b/240 via communication network 126 and network communication links 128/228.

Flowchart 480 further includes verifying, using the identifier included in request 156, the authorization status of sponsor 150 (action 482). Action 482 may be performed by software code 108/208 of content delivery system 100/200, executed by processing hardware 104/204, and using user account database 116. For example, processing hardware 104/204 may execute software code 108/208 to verify the authorization status of sponsor 150 using sponsor account 120 held by sponsor 150 by confirming that the subscription held by sponsor 150 is active, by verifying that sponsor 150 has not exceeded the number of guest invitations sponsor 150 has been allocated by content delivery system 100/200, or both.

In some implementations, as shown in FIG. 4, flowchart 480 may optionally include obtaining registration data for the user of the one of user device(s) 140a/140b/240 from which request 156 is received in action 481 (action 483). In some implementations, processing hardware 104 may executed software code 108/208 to respond to request 156, once the authorization status of sponsor 150 has been verified in action 482, by requiring that the user of the one of user device(s) 140a/140b/240 from which request 156 is received in action 481 register with content delivery system 100/200. In those implementations, flowchart 480 may further include creating guest account 122 or 124 for that user authorizing the access to the first content (484). In implementations in which optional actions 483 and 484 are performed, those actions may be performed by software code 108/208 of content delivery system 100/200, executed by processing hardware 104/204.

Flowchart 480 further includes transmitting to the one of user device(s) 140a/140b/240 from which request 156 is received in action 481, based on verification of the authorization status of sponsor 150, content access data 158 enabling access to the first content by the user of the one of user device(s) 140a/140b/240 from which request 156 is received (action 485). As noted above, actions 483 and 484 are optional. Thus, in some implementations, action 485 may follow action 484, while in other implementations, action 485 may follow directly from action 482, and actions 483 and 484 may be omitted.

Content access data 158 may include an authentication code or token, or a link, enabling the access to the first content. Content access data 158 may include a code in the form of a stateless token, or may include a strongly random code that corresponds to some persistence layer. In use cases in which content access data 158 takes the form of a link, content access data 158 may include a Uniform Resource Identifier (URI), such as a Uniform Resource Locator (URL) enabling the user to access the first content identified by request 156.

Content access data 158 may be transmitted to the one of user device(s) 140a/140b/240 from which request 156 was received, in action 485, by software code 108/208 of content delivery system 100/200, executed by processing hardware 104/204. As shown in FIG. 1, content access data 158 may be transmitted to the one of user device(s) 140a/140b/240 from which request 156 was received, via communication network 126 and network communication links 128/228.

Flowchart 480 further includes detecting that the user of the user device to which content access data is transmitted in action 485 is accessing the first content (action 486). Action 486 may be performed by software code 108/208 of content delivery system 100/200, executed by processing hardware 104/204. For example, because the first content sought by the one or user(s) 152a/152b in request 156 is content included in content database 118 and is provided by content delivery system 100/200, software code 108/208 may monitor the delivery of that first content to the one of user device(s) 140a/140b/240 from which is 156 was received in action 481.

Flowchart 480 further includes offering, in response to the detecting performed in action 486, an opportunity to the user of the one of user device(s) 140a/140b/240 from which request 156 is received in action 481 to obtain access to the plurality of contents available from content delivery system 100/200 (action 487). In some implementations, the opportunity to obtain access to the plurality of contents offered in action 487 may be one or more of content-specific, usage-limited, or time-limited.

A content-specific opportunity may be an offer to the user to obtain access to individual episodes of TV content, an entire series or season of such content, or a movie, digital book, music album, or video game in its entirety in exchange for a one-time payment, without requiring that the user subscribe to content delivery system 100/200. A usage-limited opportunity may be an offer to the user to consume a predetermined number of TV episodes, movies, digital books, music albums, or video games, or any combination of that content, in exchange for a one-time payment, without requiring the user to subscribe to content delivery system 100/200. A time-limited opportunity may be an offer to the user to consume an unlimited number of TV episodes, movies, digital books, music albums, or video games, or any combination of that content, for a predetermined period of time, such as twenty-four hours, forty-hours, or one week, for example, in exchange for a one-time payment.

Alternatively, the opportunity to obtain access to the plurality of contents offered in action 487 may be the purchase of a subscription to content delivery system 100/200. It is noted that in implementations in which guest account 122 or 124 is created for the user in action 484, the opportunity to obtain the access to the plurality of contents available from content delivery system 100/200, in action 487, may include conversion of guest account 122 or 124 to a subscription to content delivery system 100/200. Action 487 may be performed by software code 108/208 of content delivery system 100/200, executed by processing hardware 104/204.

With respect to the method outlined by flowchart 480, it is noted that actions 481, 482. 485, 486, and 487, or actions 481, 482, 483, 484, 485, 486, and 487, may be performed as automated processes from which human involvement may be omitted.

Thus, the present application discloses systems and methods for automating sponsor initiated content delivery that address and overcome existing obstacles to content sharing. For example, when applied to the exemplary use case of a subscription-based content deliver service, the novel and inventive solution disclosed in the present application advantageously serves the interests of a subscribing user in sharing their content consumption experience with friends, while also serving the interests of the content delivery service in promoting its proprietary content. In addition, because the content access enabled by the present solution is limited in scope, it is advantageously less subject to abuse than a traditional free trial subscription model. Moreover, because guest users granted access to content are endorsed by sponsors having known proclivities and preferences, the present solution advantageously provides additional opportunities to perform targeted promotion of content and subscription services to users who are not presently subscribers.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A content delivery system comprising:
   a computing platform having a processing hardware and a system memory storing a software code;
   the processing hardware configured to execute the software code to:
   receive, from a user device utilized by a user, a request for access to a first content of a plurality of contents, the request including an identifier of a sponsor of the request;
   verify, using the identifier, that the sponsor has not exceeded a number of allocated guest invitations;
   transmit to the user device, based on verification that the sponsor has not exceeded the number of allocated guest invitations, content access data enabling the access to the first content by the user;
   detect that the user is accessing the first content; and
   offer, in response to detecting, an opportunity to the user to obtain access to the plurality of contents.

2. The content delivery system of claim 1, wherein the sponsor is a subscriber to the content delivery system, and the user is a non-subscriber to the content delivery system.

3. The content delivery system of claim 1, wherein the sponsor is a business affiliate of the content delivery system, and the user is a non-subscriber to the content delivery system.

4. The content delivery system of claim 1, wherein the access to the first content is a usage-limited access.

5. The content delivery system of claim 1, wherein the access to the first content is a time-limited access.

6. The content delivery system of claim 1, wherein the opportunity to obtain the access to the plurality of contents is content-specific.

7. The content delivery system of claim 1, wherein the opportunity to obtain the access to the plurality of contents is at least one of time-limited or usage-limited.

8. The content delivery system of claim 1, wherein the opportunity to obtain the access to the plurality of contents comprises purchase of a subscription to the content delivery system.

9. The content delivery system of claim 1, wherein before transmitting the content access data to the user device, the processing hardware is further configured to execute the software code to:
   obtain registration data for the user from the user device; and
   create a guest account for the user authorizing the access to the first content.

10. The content delivery system of claim 9, wherein the opportunity to obtain the access to the plurality of contents comprises conversion of the guest account to a subscription to the content delivery system.

11. A method for use by a content delivery system including a computing platform having a processing hardware, and a system memory storing a software code, the method comprising:
    receiving from a user device utilized by a user, by the software code executed by the processing hardware, a request for access to a first content of a plurality of contents, the request including an identifier of a sponsor of the request;
    verifying, by the software code executed by the processing hardware and using the identifier, that the sponsor has not exceeded a number of allocated guest invitations;
    transmitting to the user device, by the software code executed by the processing hardware based on verification that the sponsor has not exceeded the number of allocated guest invitations, content access data enabling the access to the first content by the user;
    detecting, by the software code executed by the processing hardware, that the user is accessing the first content; and
    offering, by the software code executed by the processing hardware in response to detecting, an opportunity to the user to obtain access to the plurality of contents.

12. The method of claim 11, wherein the sponsor is a subscriber to the content delivery system, and the user is a non-subscriber to the content delivery system.

13. The method of claim 11, wherein the sponsor is a business affiliate of the content delivery system, and the user is a non-subscriber to the content delivery system.

14. The method of claim 11, wherein the access to the first content is a usage-limited access.

15. The method of claim 11, wherein the access to the first content is a time-limited access.

16. The method of claim 11, wherein the opportunity to obtain the access to the plurality of contents is content-specific.

17. The method of claim 11, wherein the opportunity to obtain the access to the plurality of contents is at least one of time-limited or usage-limited.

18. The method of claim 11, wherein the opportunity to obtain the access to the plurality of contents comprises purchase of a subscription to the content delivery system.

19. The method of claim 11, further comprising, before transmitting the content access data to the user device:
    obtaining, by the software code executed by the processing hardware, registration data for the user from the user device; and
    creating, by the software code executed by the processing hardware, a guest account for the user authorizing the access to the first content.

20. The method of claim 19, wherein the opportunity to obtain the access to the plurality of contents comprises conversion of the guest account to a subscription to the content delivery system.

* * * * *